United States Patent [19]

Suzuki et al.

[11] 4,196,255

[45] Apr. 1, 1980

[54] ELASTOMERIC COMPOSITION

[75] Inventors: Takeshi Suzuki, Kyoto; Yasuyoshi Furukawa, Ikedaminami; Masayasu Tomoda, Otsu; Yutaka Ueta, Osaka, all of Japan

[73] Assignee: Daikin Kogyo Co., Ltd., Osaka, Japan

[21] Appl. No.: 19,256

[22] Filed: Mar. 9, 1979

[30] Foreign Application Priority Data

Mar. 10, 1978 [JP] Japan .................................. 53-28101

[51] Int. Cl.$^2$ ............................................. C08G 65/32
[52] U.S. Cl. .................................. 428/421; 428/422; 428/539; 525/403; 528/87; 528/401
[58] Field of Search ...................... 528/404, 401, 87; 428/421, 422, 539

[56] References Cited

U.S. PATENT DOCUMENTS

| | | | |
|---|---|---|---|
| 3,700,650 | 10/1972 | Hani et al. | 260/79 |
| 4,051,078 | 9/1977 | Kato et al. | 260/2 A |

*Primary Examiner*—Earl A. Nielsen
*Attorney, Agent, or Firm*—Birch, Stewart, Kolasch and Birch

[57] ABSTRACT

A crosslinkable elastomeric composition which comprises an epichlorohydrin elastomer, a divalent metal oxide or hydroxide, a fluorine-containing polyhydroxy compound and a basic compound having a nitrogen or phosphorus atom in the molecule.

9 Claims, No Drawings

ELASTOMERIC COMPOSITION

The present invention relates to an elastomeric composition. More particularly, it relates to a crosslinkable elastomeric composition comprising an epichlorohydrin elastomer.

An epichlorohydrin elastomer has a linkage of —O— and does not have any unsaturation in its molecule. Due to these structural characteristics, it has advantageous properties such as oil resistance, heat resistance and low temperature resistance and also disadvantageous properties such as oxidative deterioration at high temperatures, corrosion to metal substrates and adhesion onto rolls. Although various proposals have been made to overcome the said disadvantageous properties, those are still not satisfactory. In addition, the crosslinking reaction does not sufficiently proceed in conventional crosslinkable systems, and various troubles are produced therefrom.

As the result of an extensive study, it has now been found that an elastomeric composition comprising an epichlorohydrin elastomer with a divalent metal oxide or hydroxide, a fluorine-containing polyhydroxy compound and a basic compound having a nitrogen or phosphorus atom in the molecule shows good mechanical properties such as tensile strength, elongation and hardness without the said disadvantageous properties. In addition, the said elastomer composition has surprisingly a good adhesiveness onto a fluoroelastomer which is, in general, hardly adhesive to any other resinous material.

The elastomeric composition of the present invention comprises as the essential components an epichlorohydrin elastomer, a divalent metal oxide or hydroxide, a fluorine-containing polyhydroxy compound and a basic compound having a nitrogen or phosphorus atom in the molecule.

The epichlorohydrin elastomer may be a polymer which has a unit of —CH$_2$Cl and optionally a unit of —CHX— (wherein X is a halogen atom such as chlorine or bromine) and can undergo dehalogenation so as to be crosslinked. Specifically, the epichlorohydrin elastomer may be a homopolymer of epichlorohydrin or a copolymer of epichlorohydrin with one or more of any other copolymerizable monomer(s) such as ethylene oxide, epibromohydrin, propylene oxide, styrene oxide and allyl glycidyl ether. In case of the copolymer, the content of epichlorohydrin is usually not less than 50 mol%, but this is not limitative. The kind and production of the epichlorohydrin elastomer may be referred to in the Encyclopedia of Polymer Science and Technology, Vol. 6, page 196, published by John Wiley & Sons, inc. (1967).

Examples of the divalent metal oxide or hydroxide are CaO, Ca(OH)$_2$, MgO, Mg(OH)$_2$, PbO, Pb$_3$O$_4$, Pb(OH)$_2$, BaO, Ba(OH)$_2$, ZnO, Zn(OH)$_2$, etc. The amount of the divalent metal oxide or hydroxide to be used may be usually from 1 to 40 parts by weight, preferably from 2 to 20 parts by weight, to 100 parts by weight of the epichlorohydrin elastomer.

As the fluorine-containing polyhydroxy compound, there may be exemplified 2,2-bis(4-hydroxyphenyl)perfluoropropane (Bisphenol AF), 2,2-bis(4-hydroxyphenyl)tetrafluorodichloropropane, 2-(4-hydroxyphenyl)-1,1,1,3,3,3-hexafluoro-2-propanol, HOCH$_2$(CF$_2$)$_3$CH$_2$OH, HOCH$_2$CF$_2$CFH(CF$_2$)$_3$CFHCF$_2$CH$_2$OH, HOCH$_2$CH$_2$CH$_2$(CF$_2$)$_3$CH$_2$CH$_2$CH$_2$OH, HOCH$_2$CF$_2$CH$_2$(CF$_2$)$_3$CH$_2$CF$_2$CH$_2$OH, etc. Their alkali metal salts and alkaline earth metal salts are also usable. Among them, the use of Bisphenol AF is particularly favorable. The amount of the fluorine-containing polyhydroxy compound to be employed may be usually from 0.5 to 10 parts by weight, preferably from 1 to 6 parts, to 100 parts by weight of the epichlorohydrin elastomer.

As the basic compound having nitrogen or phosphorus atom, there may be used, for instance, the following ones:

(a) Amines represented by one of the formulae:

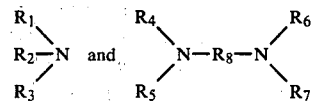

wherein R$_1$, R$_2$ and R$_3$ are each an alkyl group having 1 to 20 carbon atoms, or one of them may be a cycloalkyl group having 5 or 6 carbon atoms, or two of them may be bonded together to make a nitrogen-containing ring, R$_4$, R$_5$, R$_6$ and R$_7$ are each an alkyl group having 1 to 6 carbon atoms, or R$_4$ and R$_6$ and/or R$_5$ and R$_7$ may be linked to each make a nitrogen-containing ring, and R$_8$ is an alkylene group having 1 to 21 carbon atoms, and their salts with organic or inorganic acids;

(b) Cyclic amines represented by one of the formulae:

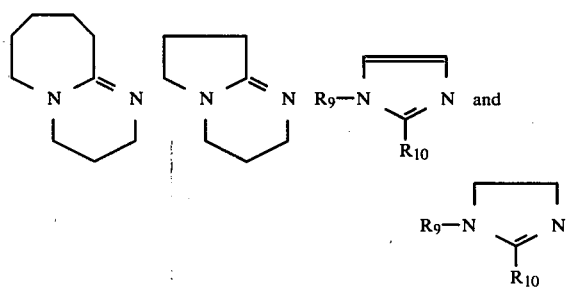

wherein R$_9$ is a hydrogen atom, an alkyl group having 1 to 20 carbon atoms or an aralkyl group having 7 to 20 carbon atoms and R$_{10}$ is an alkyl group having 1 to 12 carbon atoms or an aryl group having 6 to 12 carbon atoms, and their salts with organic or inorganic acids;

(c) Phosphorus compounds represented by the formula:

wherein X, Y and Z are each an alkyl group having 1 to 20 carbon atoms or an aryl group having 6 to 20 carbon atoms.

The amount of the basic compound to be used is usually from 0.5 to 10 parts by weight, preferably from 0.5 to 5 parts by weight, to 100 parts of the epichlorohydrin elastomer.

In addition to the above essential components, the elastomeric composition of the invention may comprise optionally an organic additive in order to enhance the plasticity and the heat resistance. It may also comprise an inorganic filler such as carbon black.

The essential components and, if used, the optional components as above stated are mixed together to make a uniform composition, which is then subjected to cross-linking by a per se conventional procedure. Since all or most of the components in the composition are soluble in ketones, the composition may be used in the form of solution. For instance, the composition in solution may be applied onto a shaped product such as a paper, a cloth, a sheet, a film, a tube or a vessel to make a coating layer, which is then subjected to crosslinking.

As hereinabove mentioned, the elastomeric composition of the invention shows a good adhesiveness onto a fluoroelastomer. When a shaped product of the elastomeric composition of the invention is subjected to cross-linking in the state of contact with a shaped product of a crosslinkable composition comprising a fluoroelastomer, a firm adhesion can be achieved between them. In view of such advantageous property, the elastomeric composition of the invention may be, for instance, shaped in a sheet having a uniform thickness, placed on a sheet made of a crosslinkable composition comprising a fluoroelastomer and having a uniform thickness and subjected to crosslinking under pressure by the aid of a heat press or a vulcanizing pan, whereby a layered product having a good adhesion between both sheets is obtained. The thus obtained layered product is excellent in resistance to fuel oils and therefore may be used as a construction material in fuel oil systems such as airplanes, automobiles and ships.

Still, the term "fluoroelastomer" hereinabove used is intended to mean a highly fluorinated copolymer with elasticity. Specific examples are copolymers vinylidene fluoride with one or more of other fluorinated olefins such as hexafluoropropene, pentafluoropropene, trifluoroethylene, trifluororochloroethylene, tetrafluorethylene, vinyl fluoride, perfluoromethyl vinyl ether and perfluoropropyl vinyl ether. Among them, vinylidene fluoride-hexafluoropropene copolymer and vinylidene fluoride-tetrafluoroethylene-hexafluoropropene copolymer are particularly preferable.

Practical and presently preferred embodiments of the present invention are illustratively shown in the following Examples and Comparative Examples.

EXAMPLES 1 TO 5 AND COMPARATIVE EXAMPLES 1 TO 2

The epichlorohydrin elastomeric composition as shown in Table 1 was kneaded by the aid of a roll under cooling with water and subjected to crosslinking under the following conditions: primary crosslinking (press vulcanization), 150° C. for 30 minutes; secondary crosslinking (oven vulcanization), 150° C. for 3 hours. The thus obtained vulcanized elastomer in a sheet form or in a block form was subjected to measurement of physical properties according to JIS K-6301. The results are shown in Table 1 wherein Herclor C (epichlorohydrin-/ethylene oxide (1:1 by mol) copolymeric elastomer; manufactured by Hercules Inc.) is an epichlorohydrin elastomer, Sumilizer MB (2-mercaptobenzimidazole; manufactured by Sumitomo Chemical Co., Ltd.) is a stabilizer and Soxinol 22 (2-mercaptoimidazoline; manufactured by Sumitomo Chemical Co., Ltd.) is a crosslinking agent. SRF and FEF are both carbon blacks manufactured by Tokai Carbon Co., Ltd., and DBU is 1,8-diazabicyclo(5.4.0)-undecene-7.

Table 1

| | Composition | Example 1 | Example 2 | Example 3 | Example 4 | Example 5 | Comparative Example 1 | Comparative Example 2 |
|---|---|---|---|---|---|---|---|---|
| Part(s) by weight | Herclor C | 100 | 100 | 100 | 100 | 100 | 100 | 100 |
| | Carbon black | — | SRF 20 | SRF 20 | SRF 50 | SRF 50 | FEF 50 | SRF 50 |
| | Calcium hydroxide | 6 | 6 | 6 | 6 | 6 | | |
| | Magnesium oxide (high activity) | 5 | 5 | | 3 | | | |
| | Red lead | | | 8 | | 8 | 8 | 5 |
| | Bisphenol AF (HOCH$_2$CF$_2$CFH)$_2$(CF$_2$)$_4$ | 1.5 | 3 | 2 | 1.5 | 2 | | |
| | Triethylene-diamine | 1.0 | 1.0 | 1.0 | | | | |
| | DBU | | | | 1.0 | 1.0 | | |
| | Sumilizer MB | | | | | 1.0 | 1.5 | 1.0 |
| | Soxinol 22 | | | | | | 1.5 | 1.1 |
| | Calcium stearate | | | | | | 2 | |
| | Azelaic acid | | | | | | 4 | |
| Properties | 100% modulus (kg/cm$^2$) | | 49 | 50 | 45 | 43 | 89 | 47 |
| | Tensile strength (kg/cm$^2$) | | 102 | 145 | 115 | 120 | 136 | 98 |
| | Elongation (%) | | 230 | 240 | 250 | 240 | 160 | 190 |
| | Hardness (JIS, Hs) | | 70 | 72 | 71 | 70 | 84 | 72 |
| | Corrosion onto metal mold | None | None | None | None | None | Produced | Produced |

EXAMPLES 6 TO 8

The epichlorohydrin elastomeric composition as shown in Table 2 was kneaded well by the aid of a roll under cooling with water to make a sheet having a uniform thickness of about 1.5 mm. Separately, the fluoroelastomer composition as shown in Table 3 was kneaded well by the aid of a roll under cooling with water to make a sheet having a uniform thickness of about 1.5 mm. Both sheets were cut in a square form (6 cm×10 cm), and the epichlorohydrin elastomer sheet was placed on the fluoroelastomer sheet and subjected to crosslinking at 160° C. under pressure by the aid of a heat press for 30 minutes to make a layered product.

The layered product was cut in a rectangular form 1 inch wide to make a test piece, which was subjected to a peel-off test according to JIS K-6301. The peel-off strength at a pulling rate of 50 mm/min was measured, and the results are shown in Table 4, from which it is understood that the epichlorohydrin elastomer and the fluoroelastomer are adhered firmly.

Table 2

| Composition (part(s) by weight) | Example | | |
|---|---|---|---|
| | 6 | 7 | 8 |
| Herclor C | 100 | 100 | 100 |
| Carbon black (FEF) | 15 | 20 | 20 |
| Calcium hydroxide | 6 | 6 | 6 |
| Magnesium oxide | 5 | — | 5 |
| Red lead | — | 8 | — |
| Bisphenol AF | 3 | 3 | 3 |
| Triethylenediamine | 0.8 | 0.8 | 0.8 |
| Stearic acid | 1 | 1 | 1 |
| $H(CF_2CF_2)_4COONH_4$ | — | — | 3 |

Table 3

| Composition | Part(s) by weight |
|---|---|
| Fluoroelastomer (vinylidene fluoride/hexafluoropropylene copolymer) | 100 |
| Carbon black (SRF) | 13 |
| Calcium hydroxide | 6 |
| Magnesium oxide | 3 |
| Bisphenol AF | 1.45 |
| 8-Benzyl-1,8-diazabicyclo(5.4.0)-7-undecenium chloride | 0.218 |

Tabl4 4

| Example | Peel-off Strength (kg/inch) |
|---|---|
| 6 | 5.2 |
| 7 | 7.4 |
| 8 | 7.7 |

What is claimed is:

1. A crosslinkable elastomeric composition which comprises an epichlorohydrin elastomer, a divalent metal oxide or hydroxide, a fluorine-containing polyhydroxy compound and a basic compound having a nitrogen or phosphorus atom in the molecule.

2. The composition according to claim 1, wherein the epichlorohydrin elastomer is a homopolymer of epichlorohydrin or a copolymer of epichlorohydrin with at least one other copolymerizable monomer.

3. The composition according to claim 1, wherein the divalent metal oxide or hydroxide is CaO, Ca(OH)$_2$, MgO, Mg(OH)$_2$, PbO, Pb$_3$O$_4$, Pb(OH)$_2$, BaO, Ba(OH)$_2$, ZnO or Zn(OH)$_2$.

4. The composition according to claim 1, wherein the fluorine-containing polyhydroxy compound is 2,2-bis(4-hydroxyphenyl)perfluoropropane, 2,2-bis(4-hydroxyphenyl)tetrafluorodichloropropane, 2-(4-hydroxyphenyl)-1,1,1,3,3,3-hexafluoro-2-propanol, HOCH$_2$(CF$_2$)$_3$CH$_2$OH, HOCH$_2$CF$_2$CFH(CF$_2$)$_3$-CFHCF$_2$CH$_2$OH, HOCH$_2$CH$_2$CH$_2$(CF$_2$)$_3$CH$_2$CH$_2$C-H$_2$OH or HOCH$_2$CF$_2$CH$_2$-(CF$_2$)$_3$CH$_2$CF$_2$CH$_2$OH, or its an alkali metal or alkaline earth metal salt thereof.

5. The composition according to claim 1, wherein the basic compound is a member selected from the group consisting of amines represented by one of the formulae:

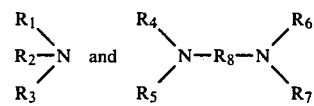

wherein R$_1$, R$_2$ and R$_3$ are each an alkyl group having 1 to 20 carbon atoms, or one of them may be a cycloalkyl group having 5 or 6 carbon atoms, or two of them may be bonded together to make a nitrogen-containing ring, R$_4$, R$_5$, R$_6$ and R$_7$ are each an alkyl group having 1 to 6 carbon atoms, or R$_4$ and R$_6$ and/or R$_5$ and R$_7$ may be linked to each make a nitrogen-containing ring, and R$_8$ is an alkylene group having 1 to 21 carbon atoms, and salts thereof with organic or inorganic acids, cyclic amines represented by one of the formulae:

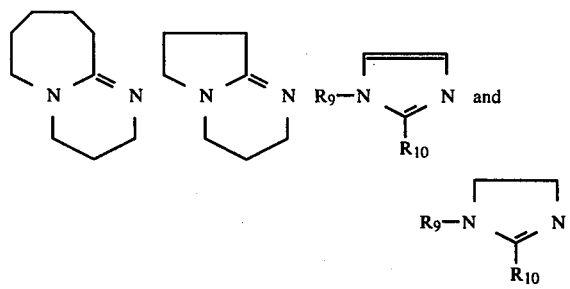

wherein R$_9$ is a hydrogen atom, an alkyl group having 1 to 20 carbon atoms or an aralkyl group having 7 to 20 carbon atoms and R$_{10}$ is an alkyl group having 1 to 12 carbon atoms or an aryl group having 6 to 12 carbon atoms, and salts thereof salts with organic or inorganic acids, and phosphorus compounds represented by the formula:

wherein X, Y and Z are each an alkyl group having 1 to 20 carbon atoms or an aryl group having 6 to 20 carbon atoms.

6. The composition according to claim 1, wherein the amount of the divalent metal oxide or hydroxide is from 1 to 40 parts by weight to 100 parts by weight of the epichlorohydrin elastomer.

7. The composition according to claim 1, wherein the amount of the fluorine-containing polyhydroxy compound is from 0.5 to 10 parts by weight to 100 parts by weight of the epichlorohydrin elastomer.

8. The composition according to claim 1, wherein the amount of the basic compound is from 0.5 to 10 parts by weight to 100 parts by weight of the epichlorohydrin elastomer.

9. A layered product comprising a layer obtained by crosslinking of the composition according to claim 1 and a layer obtained by crosslinking of a fluoroelastomer composition, both layers being adhered firmly.

* * * * *